(12) United States Patent
Morris et al.

(10) Patent No.: US 9,764,435 B2
(45) Date of Patent: Sep. 19, 2017

(54) COUNTER-FLOW HEAT EXCHANGE SYSTEMS

(71) Applicant: HONEYWELL INTERNATIONAL INC., Morristown, NJ (US)

(72) Inventors: Mark C. Morris, Phoenix, AZ (US); Donlad G. Godfrey, Phoenix, AZ (US); David Waldman, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 636 days.

(21) Appl. No.: 14/064,748

(22) Filed: Oct. 28, 2013

(65) Prior Publication Data
US 2015/0114611 A1 Apr. 30, 2015

(51) Int. Cl.
*F02C 1/00* (2006.01)
*B23P 15/26* (2006.01)
(Continued)

(52) U.S. Cl.
CPC .............. *B23P 15/26* (2013.01); *F02C 7/10* (2013.01); *F28D 7/106* (2013.01); *F28F 1/20* (2013.01);
(Continued)

(58) Field of Classification Search
CPC .... F02C 6/08; F02C 7/185; F02C 7/10; F02C 7/08; F02C 1/04; F28D 7/10; F28D 7/06;
(Continued)

(56) References Cited

U.S. PATENT DOCUMENTS 1,882,085 A 10/1932 Nelson
2,241,209 A 5/1941 Lea
(Continued)

FOREIGN PATENT DOCUMENTS

DE 102007027639 A1 * 12/2008 ............... F02C 7/10
EP 0564135 A2 10/1993
(Continued)

OTHER PUBLICATIONS

English translation of DE 102007027639 A1 provided by google patents.*

(Continued)

*Primary Examiner* — Gerald L Sung
*Assistant Examiner* — Thomas Burke
(74) *Attorney, Agent, or Firm* — Lorenz & Kopf, LLP

(57) ABSTRACT

A heat exchange system includes a tubular fan air inlet portion and a tubular cooled air outlet portion connected to a first end of a tubular mid portion. The heat exchange system further includes a tubular hot air inlet portion and a tubular recycled fan air outlet portion connected a second end of the mid portion. Still further, the heat exchange system includes an integrally-formed, compliant heat exchanger tube extending between the hot air inlet portion and the cooled air outlet portion within the mid portion to define a heat exchanger first flow passage within the heat exchanger tube and a second flow passage outside of the heat exchanger tube but within the tubular mid portion. Methods for fabricating such heat exchange systems are also provided.

10 Claims, 13 Drawing Sheets

(51) Int. Cl.
*F02C 7/10* (2006.01)
*F28F 1/20* (2006.01)
*F02C 7/141* (2006.01)
*F28D 7/10* (2006.01)
*F28D 21/00* (2006.01)

(52) U.S. Cl.
CPC ........ *F02C 7/141* (2013.01); *F05D 2260/213* (2013.01); *F28D 7/10* (2013.01); *F28D 2021/0021* (2013.01); *F28D 2021/0026* (2013.01); *F28F 2265/26* (2013.01); *Y02T 50/675* (2013.01); *Y10T 29/49361* (2015.01)

(58) Field of Classification Search
CPC .... F28F 2265/14; F28F 2265/26; F28F 1/105; F28F 1/14; F28F 1/16
See application file for complete search history.

(56) References Cited

U.S. PATENT DOCUMENTS

| | | | |
|---|---|---|---|
| 2,911,200 | A | 11/1959 | Gardner et al. |
| 3,185,210 | A | 5/1965 | Kuhne et al. |
| 3,364,548 | A | 1/1968 | Marco |
| 3,409,075 | A | 11/1968 | Long |
| 3,527,291 | A | 9/1970 | Neary et al. |
| 3,549,176 | A | 12/1970 | Contreras |
| 4,120,352 | A | 10/1978 | Husson |
| 4,350,372 | A | 9/1982 | Logsdon |
| 4,691,761 | A | 9/1987 | Kito et al. |
| 4,832,114 | A | 5/1989 | Yeh |
| 4,858,686 | A | 8/1989 | Calleson |
| 5,145,215 | A | 9/1992 | Udell |
| 5,305,616 | A | 4/1994 | Coffinberry |
| 5,407,237 | A | 4/1995 | Smolowitz |
| 5,918,667 | A | 7/1999 | Chiba et al. |
| 6,032,463 | A * | 3/2000 | Bock .............. F01N 13/10 285/226 |
| 6,263,570 | B1 | 7/2001 | Cazacu |
| 7,398,798 | B2 * | 7/2008 | Ostan .............. F16L 11/15 138/114 |
| 7,754,137 | B2 | 7/2010 | Sutcliffe et al. |
| 7,810,552 | B2 | 10/2010 | Slaughter |
| 7,866,372 | B2 | 1/2011 | Slaughter |
| 7,871,578 | B2 | 1/2011 | Schmidt |
| 8,306,665 | B2 | 11/2012 | Tsangaris et al. |
| 8,511,111 | B2 | 8/2013 | Lambert et al. |
| 2007/0251671 | A1 | 11/2007 | Barnes et al. |
| 2009/0065185 | A1 | 3/2009 | Jekerle |
| 2009/0183857 | A1 | 7/2009 | Pierce et al. |
| 2009/0211743 | A1 | 8/2009 | Schrader et al. |
| 2010/0018673 | A1 | 1/2010 | Yang |
| 2010/0043415 | A1 * | 2/2010 | Capelle .............. F28D 7/106 60/320 |
| 2011/0056653 | A1 | 3/2011 | Zacharias |
| 2011/0088405 | A1 | 4/2011 | Turco |
| 2011/0115227 | A1 | 5/2011 | Shafer et al. |
| 2011/0168369 | A1 * | 7/2011 | Kim .............. F28D 7/106 165/154 |
| 2011/0272122 | A1 | 11/2011 | Corbeil et al. |
| 2012/0232857 | A1 | 9/2012 | Fisker et al. |
| 2012/0292000 | A1 | 11/2012 | Khan et al. |
| 2013/0167812 | A1 * | 7/2013 | Kurihara .............. F02M 25/0793 123/568.11 |
| 2013/0186102 | A1 * | 7/2013 | Lo .............. F02C 7/18 60/785 |
| 2014/0110095 | A1 * | 4/2014 | Chang .............. F28F 1/40 165/181 |

FOREIGN PATENT DOCUMENTS

| | | | |
|---|---|---|---|
| EP | 1978323 A3 | 10/2008 | |
| EP | 2148074 A2 | 1/2010 | |
| EP | 2620618 A2 | 7/2013 | |
| EP | 2642083 A2 | 9/2013 | |
| JP | 2002130060 A | 5/2002 | |
| KR | EP 2420790 A2 * | 2/2012 | ............. F28D 7/106 |
| WO | 2006085792 A1 | 8/2006 | |
| WO | 2012028747 A1 | 3/2012 | |

OTHER PUBLICATIONS

USPTO Notice of Allowance for U.S. Appl. No. 13/412,761; Notification Date Sep. 2, 2015.
Huan, Z et al.; Application of laser sintering technology in heat exchanger design and manufacture; Jun. 17, 2010; IEEE Xplore—Retrieved from the internet at: http://ieeexplore.ieee.org/xpl/freeabs_all.jsp?arnumber=5486244.
Liew L.S. et al.; The Application of the Brazing Process in Selective Laser Sintering Fabricated Parts—JSMEA; vol. 46 (2003), No. 3 Special Issue on Recent Advances in Materials and Processing pp. 506-511; Retrieved from the internet at: http://www.jstage.jst.go.jp/article/jsmea/46/3/46_506/_article.
Terutake, H. et al.; The application of blazing process in SLS process fabricated heat exchanger; Science Links Japan—Retrieved from the internet at: http://sciencelinks.jp/j-east/article/200324/000020032403A0818549.php.
Rapid prototyping shows its metal; Eureka—The Site for Engineering Design; Retrieved from the internet at: http://www.eurekamagazine.co.uk/article/27538/Rapid-prototyping-shows-its-metal.aspx.
Wong, M. et al; Convective heat transfer and pressure losses across novel heat sinks fabricated by selective laser melting; Retrieved from the internet at: http://www.sciencedirect.com/science/article/pii/S0017931008003311.
Direct Metal Laser Sintering—CRDM; Retrieved from the internet at: http://www.crdm.co.uk/direct-metal-laser-sintering-services.html.
Lepkowski, J. et al.; Zener diode based integrated filters, an alternative to traditional EMI filter devices.
Antoine D.: "3D Printer Spider-Bots" Nov. 18, 2011, retrieved from the internet on Mar. 14, 2013, URL: http://www.growit3d.com/growit-blog/3d-printed-spider-bots/.
ProtoCAM's "Selective Laser Sintering (SLS), SLS Prototype" retrieved from the internet on Mar. 14, 2013, URL: http://www.protocam.com/html/sls.html.
Within's "Micro Cooler—Demonstrating an Effective Micro Cooling Control" retrieved from the Internet on Jun. 3, 2013, URL: http://withinlab.com/case-studies/index19.php.
Huan, Z et al; IEEE Explore—Application of Laser Sintering Technology in Heat Exchanger design and Manufacture; Issue date Apr. 16-18, 2010.
Wong, M et al; Convective Heat Transfer and Pressure Losses Across Novel Heat Sinks Fabricated by Selective Laser Melting; International Journal of Heat and Mass Transfer; vol. 52, Issues 1-2, Jan. 15, 2009, pp. 281-288.
CRDM Ltd; Direct Metal Laser Sintering; 2011; Retrieved from internet [http://www.crdm.co.uk/direct-metal-laser-sintering-services.html].
Shelley T.; Rapid Prototyping Shows Its Metal; EUREKA The Site for Engineering Design; Sep. 2010; Retrieved from internet [http://www.eurekamagazine.co.uk/article/27538/Rapid-prototyping-shows-its-metal.aspx].
Liew, LS et al; The Application of the Brazing Process in Selective Laser Sintering Fabricated Parts; JSME International Journal Series A; vol. 46 (2003), No. 3 Special Issue on Recent Advances in Materials and Processing, pp. 506-511.
Terutake, H et al; The application of blazing process in SLS process fabricated heat exchanger; Science Links Japan; vol. 11th; 2003.
USPTO Office Action for U.S. Appl. No. 13/911,904 dated Jan. 13, 2016.
EP Extended Search Report for Application No. EP 14186714.3 dated Nov. 21, 2014.
USPTO Office Action for U.S. Appl. No. 13/412,761 dated Feb. 13, 2015.

(56) References Cited

OTHER PUBLICATIONS

EP Search Report, EP 13157087.1-1605/2636982 dated Mar. 31, 2015.
EP Examination Report for Application No. EP13157087.1 dated May 26, 2015.
USPTO Office Action for U.S. Appl. No. 13/911,904; Notification Date Aug. 3, 2015.
USPTO Office Action, Notification Date May 15, 2015; U.S. Appl. No. 13/412,761.
USPTO Restriction Requirement, Notification Date May 21, 2015; U.S. Appl. No. 13/911,904.
Sabharwall, P. et al.; Diffusion-Welded Microchannel Heat Exchanger for Industrial Processes; Journal of Thermal Science and Enginering Applications, Mar. 2013, vol. 5; Copyright 2013 by Siemens AG.
Huan Z, DJ De Beer, et al.; Application of Laser Sintering Technology in Heat Exchanger Design and Manufacture; 2nd International Conference on Computer Engineering and Technology, vol. 5; Copyright 2010 IEEE.
USPTO Office Action, Notification Date Oct. 1, 2014; U.S. Appl. No. 13/412,761.
EP Extended Search Report for Application No. EP 14176161.9 dated Oct. 31, 2014.
USPTO Office Action for U.S. Appl. No. 13/911,904 dated Sep. 14, 2016.
USPTO Office Action for U.S. Appl. No. 13/911,904 dated Feb. 22, 2017.
USPTO Notice of Allowance for U.S. Appl. No. 13/911,904 dated May 1, 2017.
EP Examination for Application No. 14176161.9 dated May 10, 2017.

* cited by examiner

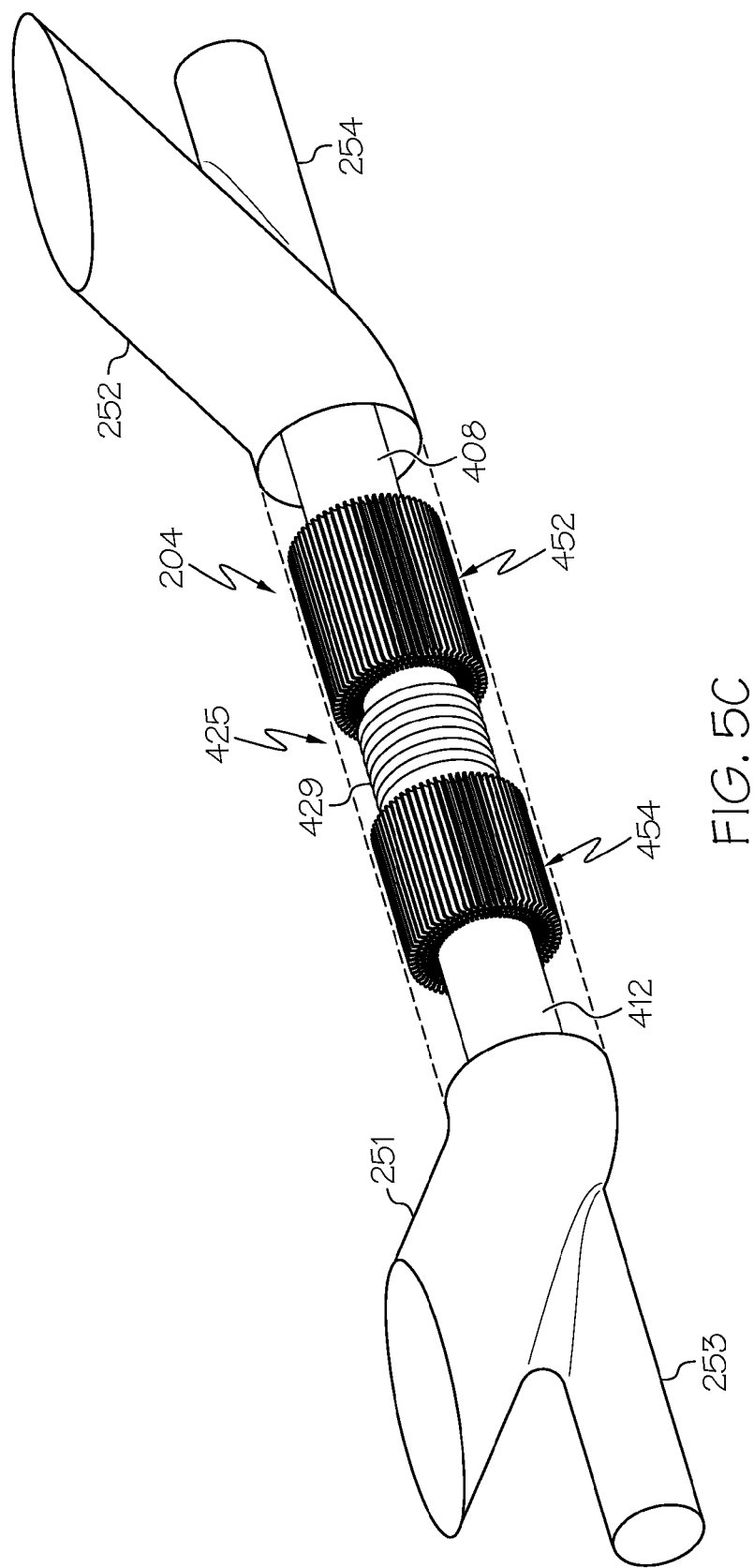

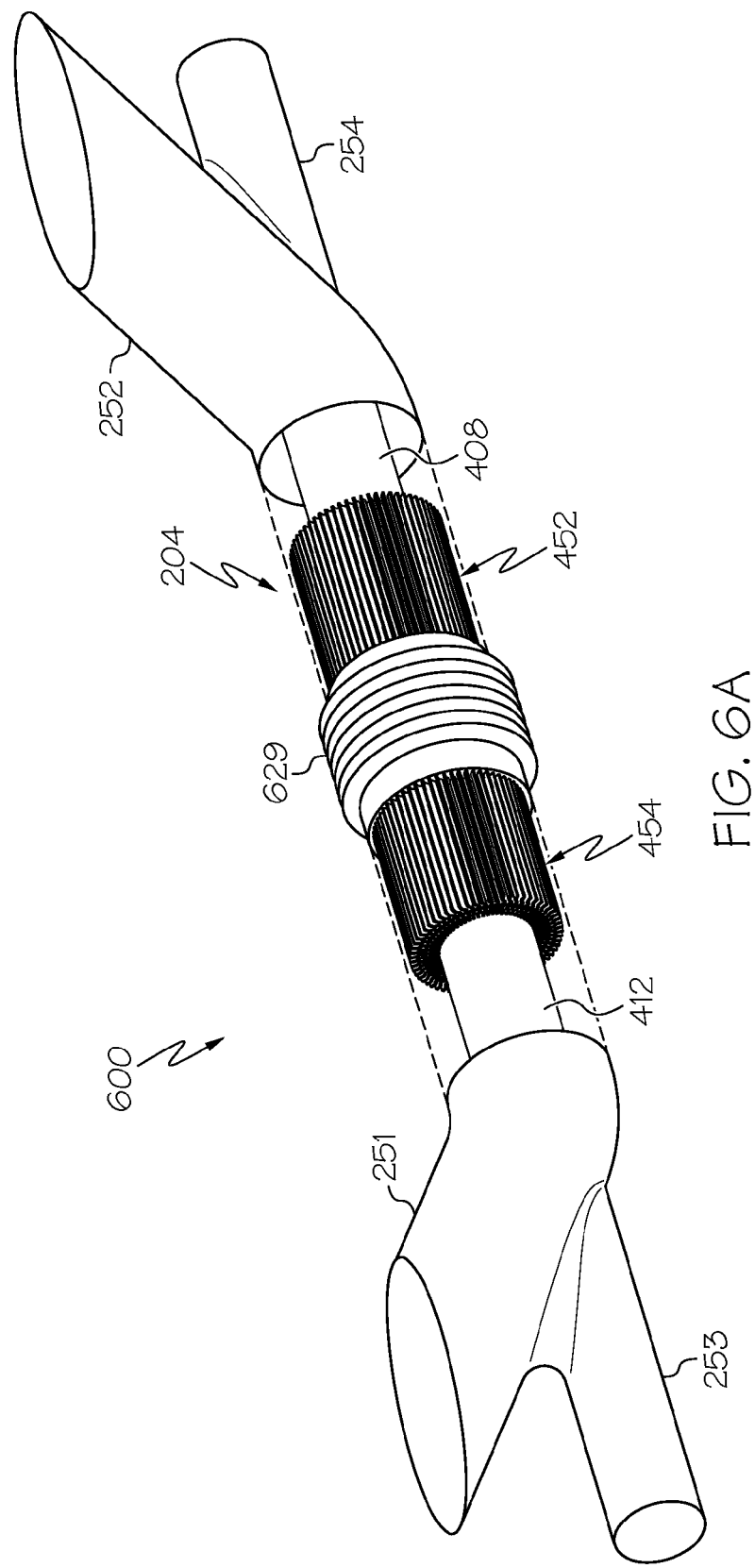

COUNTER-FLOW HEAT EXCHANGE SYSTEMS

TECHNICAL FIELD

The present disclosure generally relates to heat exchange systems. More particularly, the present disclosure relates to counter-flow heat exchange systems suitable for use in gas turbine engines, among other applications.

BACKGROUND

In the field of gas turbine technology, a great deal of effort has been, and continues to be, directed toward improving thermodynamic efficiency by operating gas turbine engines at increasing temperatures. These temperatures may exceed the temperatures that some materials within the turbine engine structure can normally tolerate. As such, cooling air may be provided to various turbine engine components using cooling air extracted from other parts of the engine. For example, in some gas turbine engines, cooling air is extracted from a plenum at the discharge of the compressor, and is then directed to certain portions of the turbine.

For some gas turbine engines, the air that is extracted from the engine for turbine cooling may be at temperatures that require the air to be cooled before being directed to the turbine. In some turbofan gas turbine propulsion engines, a portion of the fan air flowing in the bypass duct may be continuously redirected and used to cool the extracted turbine cooling air in a heat exchanger. Conventional plate-fin heat exchange architectures, however, are susceptible to thermo-mechanical fatigue (TMF), especially at braze connections, as they do not allow adequate thermal growth and stress compliance during transient and steady state operations, thereby reducing their service life and/or necessitating costly repairs. For example, components of conventional heat exchangers may be rigidly coupled to each other, restricting relative motion and inducing stresses in the heat exchanger.

Hence, there is a need for heat exchange systems with compliant components for improved TMF life, while maintaining heat exchange performance efficiency. The present disclosure addresses at least this need.

BRIEF SUMMARY

Disclosed are counter-flow heat exchange systems. In one exemplary embodiment, a heat exchange system includes a tubular fan air inlet portion and a tubular cooled air outlet portion connected to a first end of a tubular mid portion. The heat exchange system further includes a tubular hot air inlet portion and a tubular recycled fan air outlet portion connected a second end of the mid portion. Still further, the heat exchange system includes an integrally-formed, compliant heat exchanger tube extending between the hot air inlet portion and the cooled air outlet portion within the mid portion to define a heat exchanger first flow passage within the heat exchanger tube and a second flow passage outside of the heat exchanger tube but within the tubular mid portion. The integrally-formed, compliant heat exchanger tube includes a tubular member having a proximal tube end coupled with the hot air inlet portion and a distal tube end coupled with the cooled air outlet portion and including a tubular wall having an outer wall surface and an inner wall surface. The integrally-formed, compliant heat exchanger tube further includes a plurality of integral heat transfer fins extending radially outwardly from at least one portion of the tubular member.

In another exemplary embodiment, a method for manufacturing the heat exchange system as defined above includes forming the heat exchange system using an additive manufacturing (AM) technique. The additive manufacturing technique may include direct metal laser sintering (DMLS).

In yet another exemplary embodiment, the heat exchange system defined above is implemented in a gas turbine engine. The fan air inlet portion is fluidly coupled to a fan air bypass duct of the gas turbine engine, and the hot air inlet portion is fluidly coupled to a compressor section of the gas turbine engine. Further, the cooled air outlet portion directs cooling air to a compressor turbine of the gas turbine engine, and the recycled fan air outlet portion directs recycled fan air back into the fan air bypass duct.

Furthermore, other desirable features and characteristics of the heat exchange systems will become apparent from the subsequent detailed description and the appended claims, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein:

FIGS. 5A through 5C provide additional views of the exemplary heat exchange system incorporating the exemplary integrally-formed, compliant heat exchanger tube;

FIGS. 6A and 6B illustrate an alternative embodiment of a heat exchange system incorporating an integrally-formed, compliant heat exchanger tube;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the heat exchange systems described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The heat exchange systems described herein are suitable for use in gas turbine engines and other applications. Particularly, the heat exchange systems described herein may be implemented in a gas turbine engine to improve heat exchange performance, reduce manufacturing costs, and improve operational lifespan. In one implementation, the heat exchange system is embodied as a cooling air heat exchanger for reducing the temperature of cooling air prior to its delivery to turbine components that require cooling. However, it will be appreciated that the presently disclosed heat exchange systems are not limited to use in the aforementioned embodiment. Rather, it is expected that the heat exchange systems disclosed herein will be suitable for use in a wide array of applications. Some non-limiting examples include engine oil cooling, auxiliary power units, environmental control systems, chemical reaction systems, and any other systems where heat exchange between two fluid media (gas, liquid, etc.) is either required or desirable.

Figure 1:
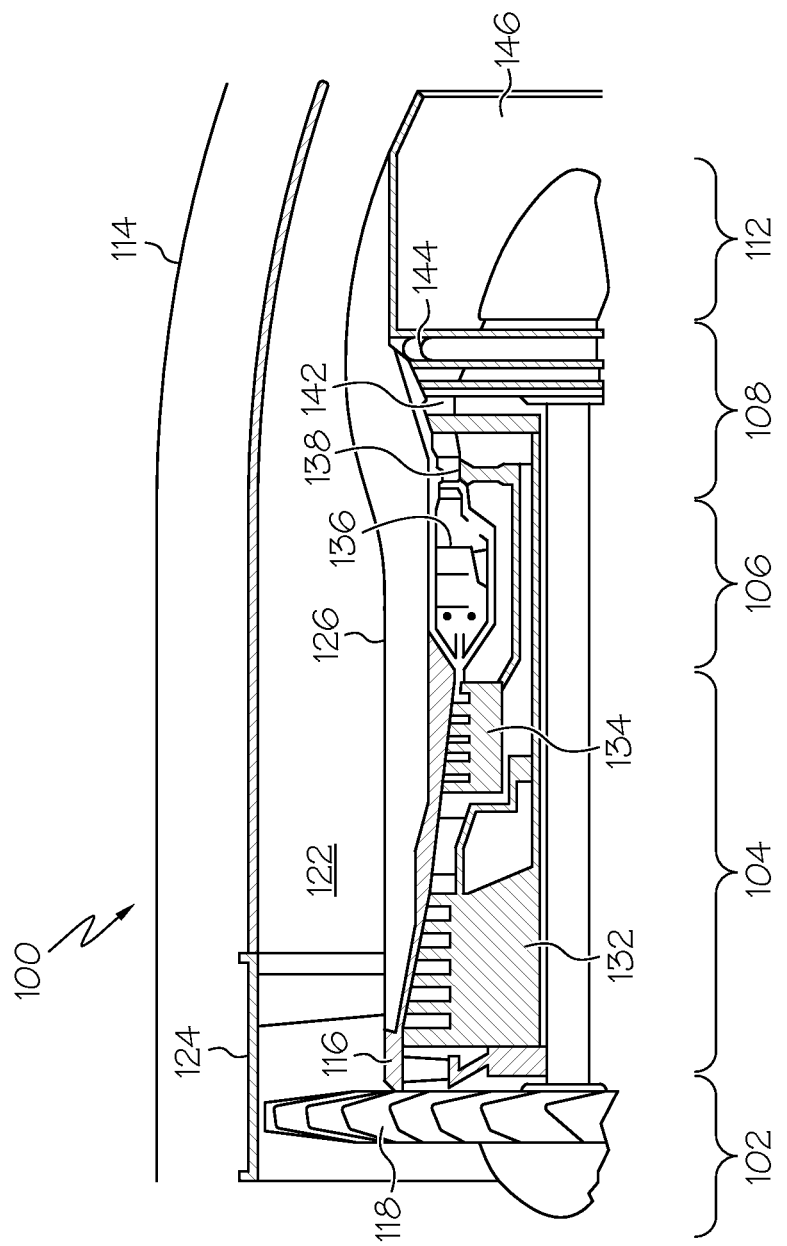
FIG. 1 depicts a simplified, cross-sectional view of a portion of an exemplary gas turbine engine into which an exemplary heat exchange system in accordance with the present disclosure may be incorporated.

In one embodiment, with reference to FIGS. 1 through 5C, as noted above, the heat exchange system may be implemented as a cooling air heat exchanger. With particular reference to FIG. 1, a simplified, cross-sectional view of an exemplary gas turbine engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct 124, which is spaced apart from and surrounds an inner fan duct 126. Most of the fan air that flows through the fan air bypass duct 122 is discharged from the bypass duct 122 to generate a forward thrust. The fraction of fan air that does not flow into the fan air bypass duct 122 is directed into the compressor section 104.

The compressor section 104 may include one or more compressors. The engine 100 depicted in FIG. 1 includes two compressors: an intermediate pressure compressor 132 and a high pressure compressor 134. No matter the number of compressors included, the air that is directed into the compressor section 104 is pressurized to a relatively high pressure. The relatively high pressure air that is discharged from the compressor section 104 is directed into the combustion section 106. The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines: a high pressure turbine 138, an intermediate pressure turbine 142, and a low pressure turbine 144. It should be appreciated, however, that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools.

During operation, the temperatures within various portions of the engine 100 may reach relatively high temperatures. Thus, as depicted more clearly in FIG. 2, the engine 100 additionally includes a cooling air system 200 to provide cooling air to these various portions within the engine 100. The cooling air system 200 extracts relatively hot air 202 from within the engine case 116, directs the relatively hot air 202 through a cooling air heat exchanger 204 to be cooled, and then directs the cooled air 206 back into the engine case 116 to provide cooling air to various portions of the engine 100. In the embodiment depicted in FIG. 2, a portion of the fan air 203 in the fan air bypass duct 122 is supplied, via an inlet 216, to the heat exchanger 204. The supplied fan air 203 flows through the heat exchanger 204 to cool the relatively hot air 202 that is extracted from the engine case 116, and is then directed back into the fan air bypass duct 122 as stream 213. In a preferred implementation, fan air may be selectively (as opposed to continuously) supplied to the heat exchanger to improve operating performance of the engine, as described in greater detail in commonly-assigned U.S. patent application Ser. No. 13/358,161 (U.S. Publication 2013/0186102 A1, published Jul. 25, 2013), titled "GAS TURBINE ENGINE IN-BOARD COOLED COOLING AIR SYSTEM," filed Jan. 25, 2012, the contents of which are herein incorporated by reference in their entirety.

Figure 2:
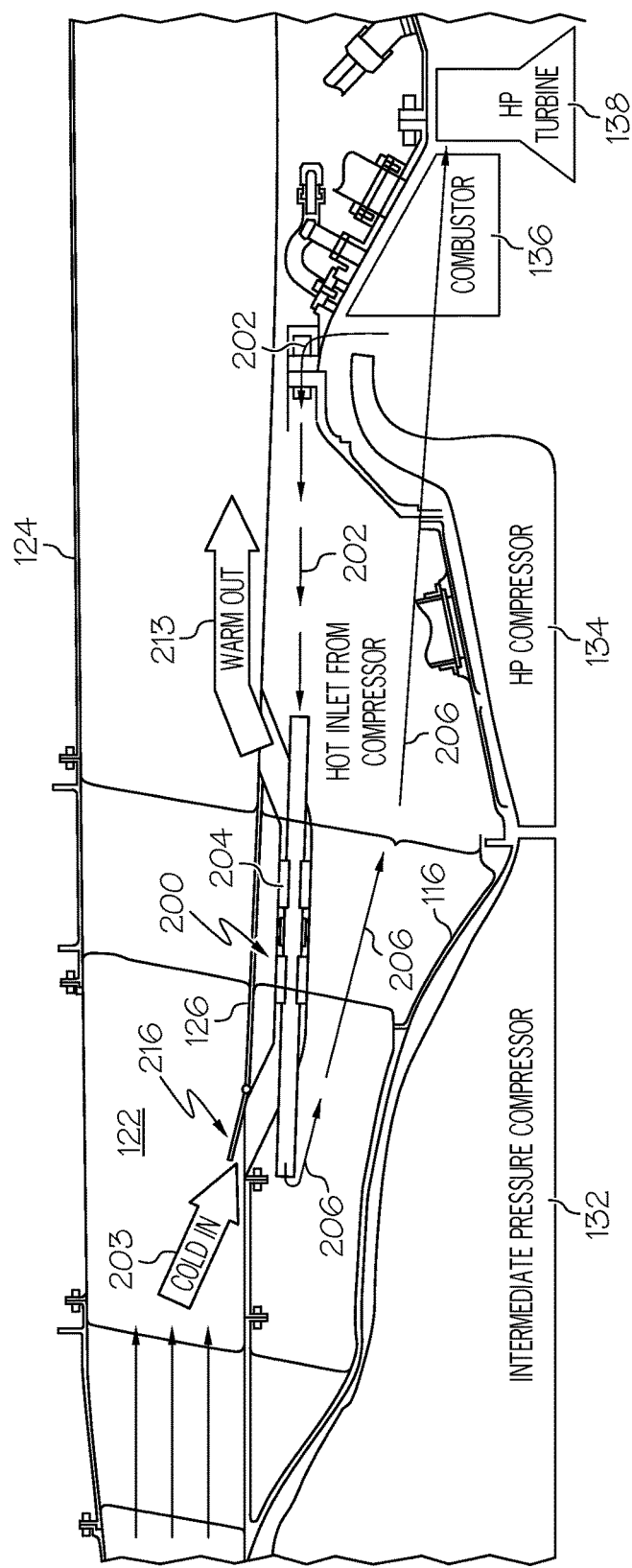
FIG. 2 depicts a close-up, cross-sectional view of a portion of the gas turbine engine as in FIG. 1, illustrating an exemplary heat exchange system in accordance with the present disclosure incorporated therein.

For clarity and ease of illustration, only a single heat exchanger 204 and inlet 216 are depicted in simplified form in FIG. 2. However, the gas turbine engine 100 preferably includes a plurality of heat exchangers 204 and a plurality of inlets 216. Each of the inlets 216 are associated with a different one of the heat exchangers 204. Although the depicted embodiment is implemented with one heat exchanger 204 and one inlet 216, it will be appreciated that this is merely exemplary of one embodiment, and that other numbers of heat exchangers 204 and inlets 216 may be used.

Figure 3A:
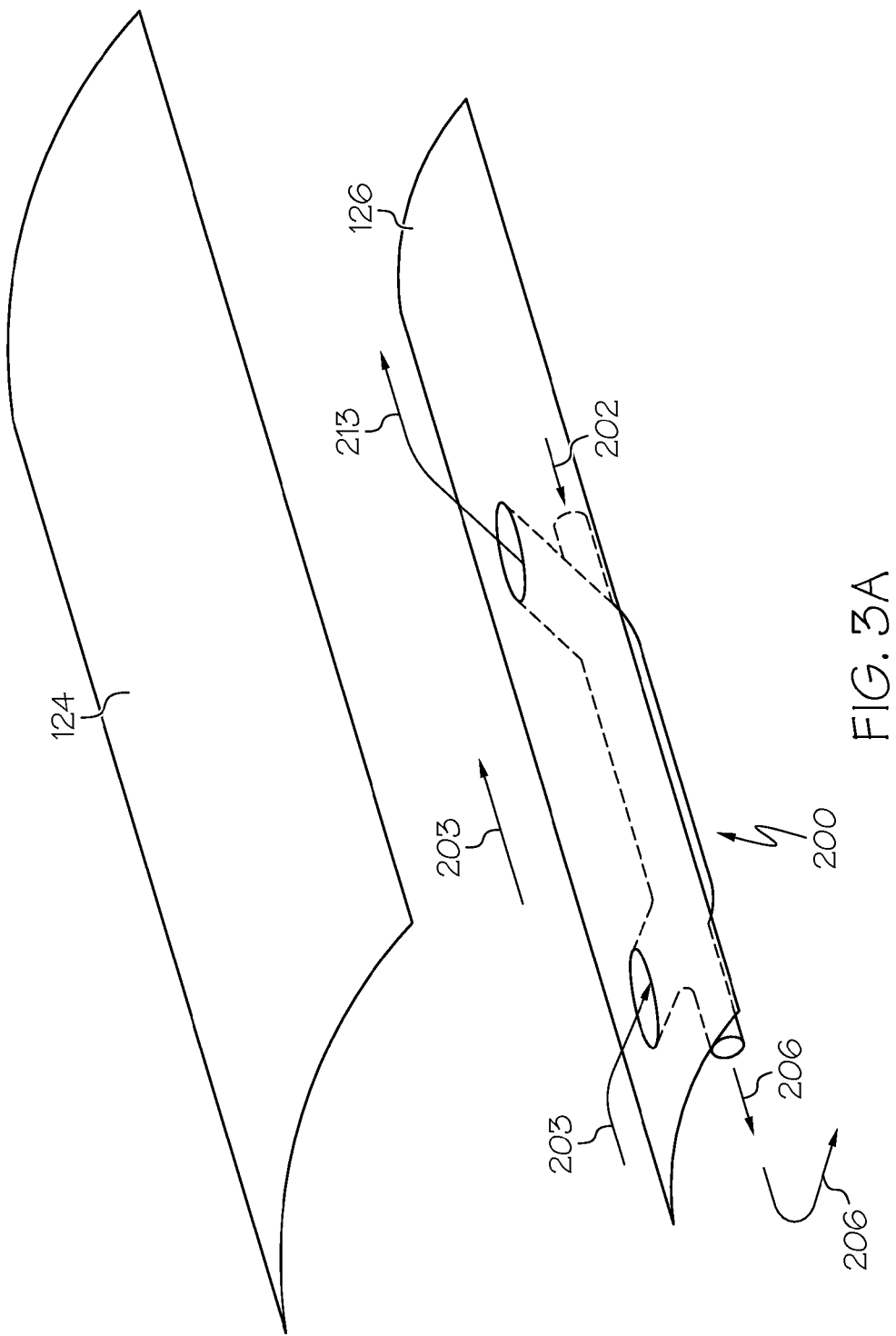
FIGS. 3A and 3B depict the exemplary heat exchange system of FIG. 2 in perspective view.
Figure 3B:
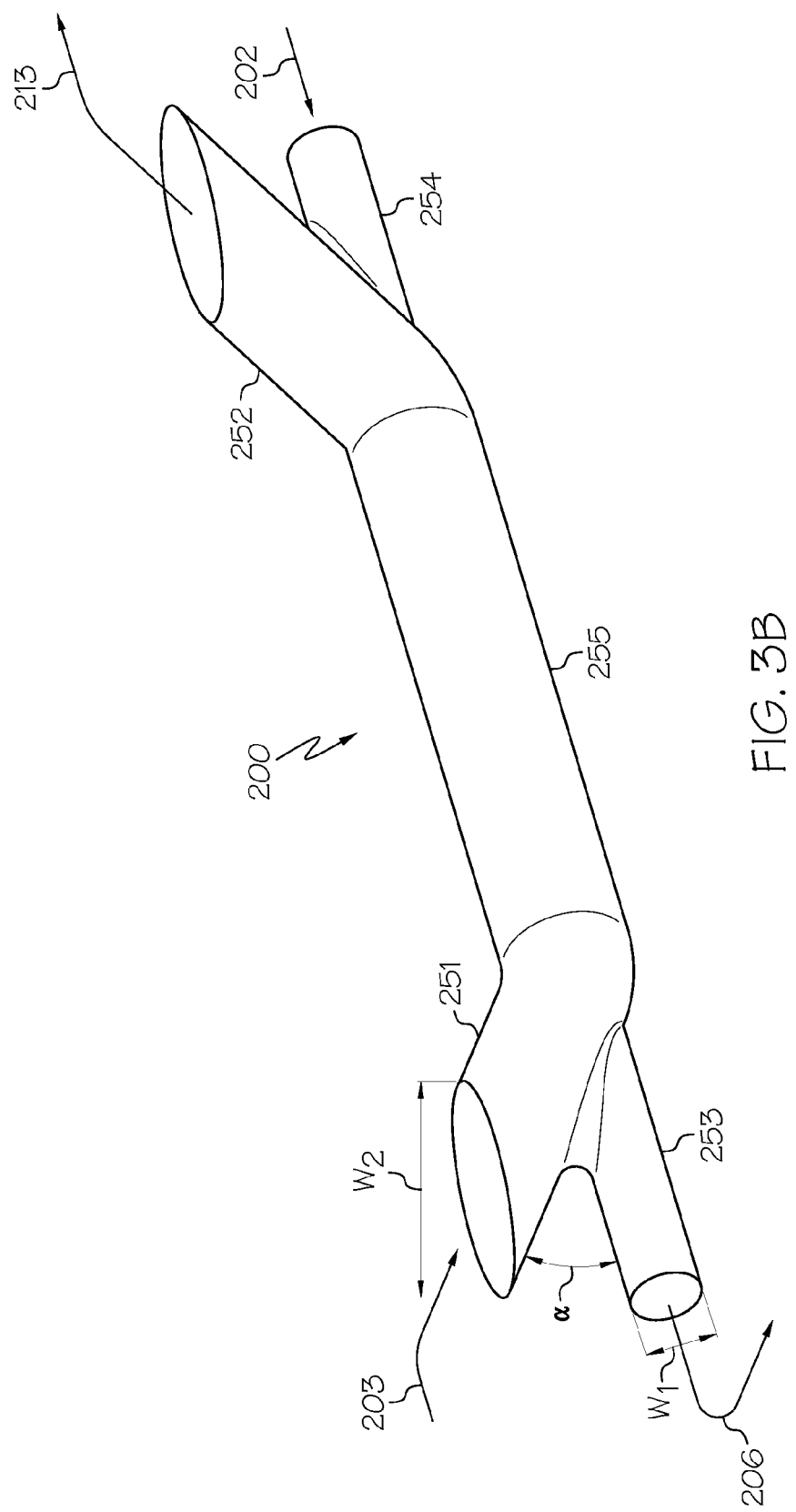

The cooling air system 200 is depicted in greater detail in FIGS. 3A and 3B. The cooling air system 200 includes a cylindrical fan air inlet portion 251, a cylindrical heat exchanger mid portion 255, and a cylindrical recycled fan air outlet portion 252. Fan air 203 flows into the inlet portion 251, through the mid portion 255, where heat is exchanged with a countercurrent hot air flow, and out from the outlet portion 252. Each of portions 251, 255, and 252 have a substantially uniform diameter or width $w_2$. Inlet portion 251 and outlet portion 252 are disposed with respect to the mid portion 255 at an angle α, which may be from about 20 degrees to about 60 degrees, with about 30 degrees to about 50 degrees being preferred to reduce flow losses as the fan air 203 is directed into and out of the cooling air system 200. The cooling air system 200 further includes a cylindrical hot air inlet portion 254 and a cylindrical cooled air outlet portion 253. Hot air flows countercurrent to the fan air through inlet 254, through the mid portion 255, where heat is exchanged with the fan air, and out from the outlet portion 253. Portions 253 and 254 have a diameter or width $w_1$, which is less than $w_2$, to allow the hot air to flow through the mid portion within a concentrically disposed flow passage in a manner (heat exchanger) countercurrent to the fan air. The portions 253 and 254 run substantially parallel to the mid portion 255, and connect therewith at approximately the point at which portions 251 and 252 connect therewith, as shown in FIGS. 3A and 3B. In some embodiments, the heat exchanger 204 is fully disposed within the outer cylinder of the mid portion 255. While the portions 251-255 are shown and described in the exemplary embodiments as being cylindrical, it will be appreciated that any other shape may be employed, such as rectangular (in cross-section), triangular, oval, etc., so as to form a tubular member for directed the flow of air.

Figure 4A:
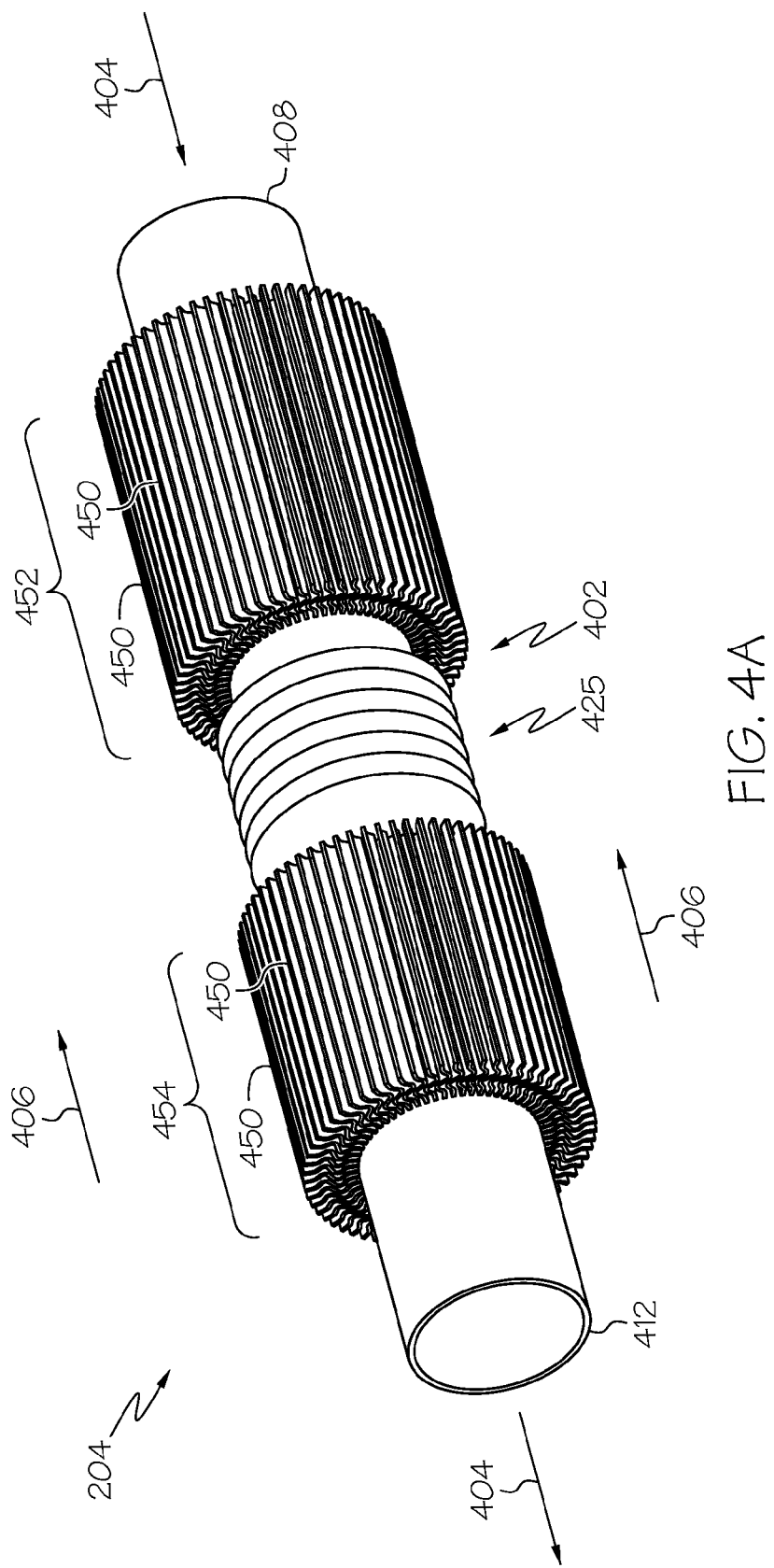
FIG. 4A is an isometric view (in isolation) of an exemplary integrally-formed, compliant heat exchanger tube of the heat exchange system shown in FIGS. 3A and 3B.
Figure 4B:
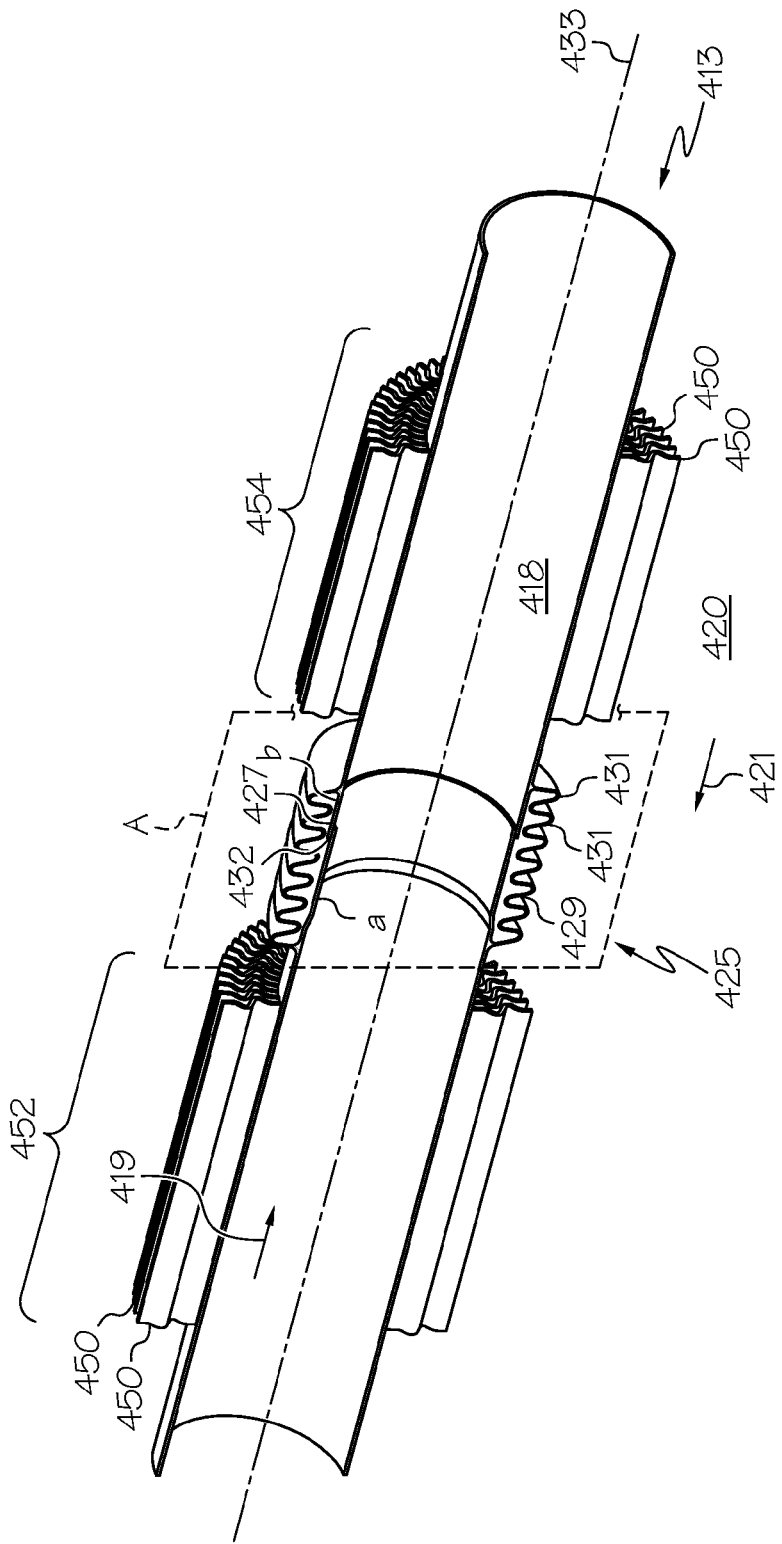
FIG. 4B is a cross-sectional view of a portion of the exemplary integrally-formed, compliant heat exchanger tube of FIG. 4A, illustrating an integral bellows portion thereof including an internal slip joint and bellows.
Figure 4C:
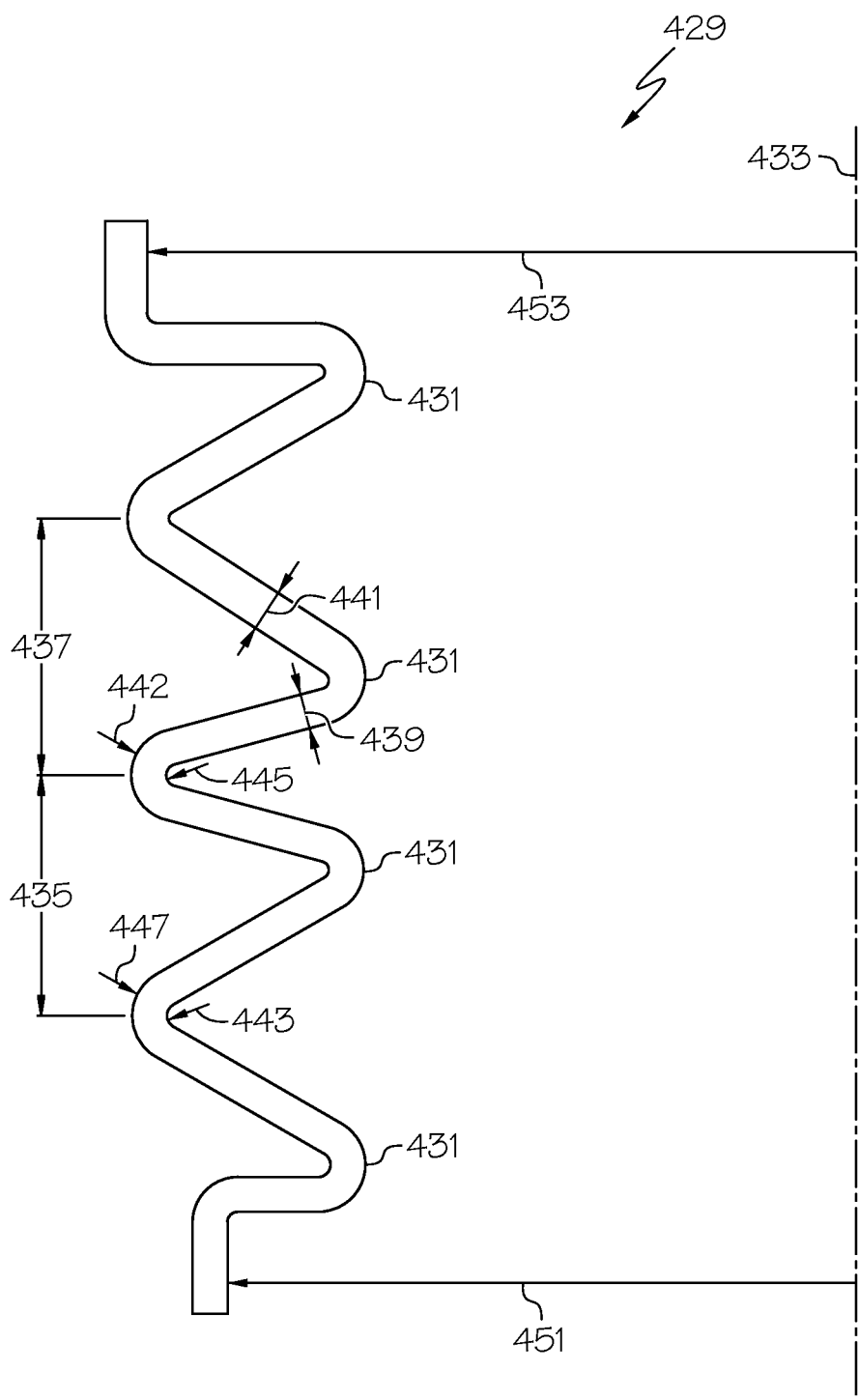
FIG. 4C is a perspective view of the exemplary bellows of the integral bellows portion of FIG. 4B.

FIGS. 4A-4C illustrate an implementation of a heat exchanger 204 that is fully disposed within the outer cylinder of the mid portion 255. The heat exchangers 204 are each configured to transfer heat between the relatively hot air 202 flowing within heat exchanger 204 and the fan air 203 flowing outside thereof and countercurrent to the hot air 202. In the depicted embodiment, each heat exchanger 204 is implemented as a tubular type that includes a tube 402, a heat exchanger first flow passage 404, and a heat exchanger second flow passage 406. Each heat exchanger first flow passage 404 includes an inlet port 408 and an outlet port 412. Each inlet port 408 receives the relatively hot air 202 from within the engine case 116 and is coupled with hot air inlet portion 254, and each heat exchanger second flow passage 406 receives fan air from the bypass flow passage 122 via fan air inlet portion 251. The relatively hot air 202 that flows into the heat exchanger inlet port 408 flows into and through the associated tubes 402 where it is cooled against fan air in the second flow passage 406, and the cooled air 206 is discharged from the associated outlet port 412, which is coupled with cooled air outlet portion 253. Although the tubes shown in FIG. 4 are shown relatively straight, in other embodiments, the tubes may be configured as curved tubes in either the tangential or radial directions, or may be curved in both the tangential and radial directions to provide optimal compliance for thermo-mechanical fatigue strength. Each heat exchanger second flow passage 406 is configured to direct the supplied fan air 203 along the associated tube 402, within mid portion 255 in a countercurrent manner against the hot air flow within the tube 402.

Each integrally-formed, compliant heat exchanger tube 402 includes a tubular member defining a flow path (a portion of the first flow passage) between the inlet port 408 and the outlet port 412, the tubular member being defined by a tubular wall 413 (FIG. 4B) defining a tube interior 418 including the first flow path and a tube exterior 420. Arrow 419 in FIG. 4B depicts the direction of flow in the tube interior 418 (i.e., in a portion of the first flow passage) and arrow 421 depicts the direction of flow from the tube exterior 420 (i.e., in a portion of the second flow passage).

Each integrally-formed, compliant heat exchanger tube 402 (FIGS. 4A and 4B) includes a plurality of integral heat transfer fins 450 extending radially outwardly from at least one portion of the tubular member. The plurality of integral heat transfer fins 450 may be arranged in one or more fin groups. For example, the integrally-formed compliant heat exchanger tubes include a first fin group 452 and a second fin group 454. The first and second fin groups 452 and 454 are located proximate the proximal tube end and the distal tube end, respectively. The fin groups may be selectively located at axial positions other than as depicted, their optimum position determined by computational fluid/heat transfer analysis and by corresponding stress analysis, as commonly performed by one skilled in the art. The fins in each fin group may be substantially in parallel relationship with each other as depicted, for optimal flow performance. The spacing between the heat transfer fins within each fin group and relative to other fin groups in the same or a different integrally-formed heat exchanger tube may be the same or different.

During the heat exchange operation, the plurality of integral heat transfer fins are exposed to the supplied fan air 203 in the second flow passage which cools the heat transfer fins, with the high thermal conductivity of the fin material allowing increased heat transfer. The integral heat transfer fins may be generally annular in shape as depicted in FIGS. 4A and 4B or may have other shapes and may be selectively oriented to direct fluid flow turning into and out of the integrally-formed, compliant heat exchanger tubes. Fin spacing, locations, and groupings are determined by computational fluid/heat transfer analysis and by corresponding stress analysis to optimize the overall performance of the unitary heat exchanger with respect to pressure drops, heat transfer, stress, and weight. Although unitary heat exchanger 204 is depicted with fourteen fins in two fin groups, it will be appreciated that this is merely exemplary, and that other numbers of fins 450 and fin groups may be used. Similarly, the number of fins and fin groups in other depicted unitary heat exchangers as described herein is merely exemplary, and other numbers of fins and fin groups may be used.

Each integrally-formed, compliant heat exchanger tube 402 further includes an integral bellows portion 425 (shown best in encircled region A of FIG. 4B). The integral bellows portion 425 may be selectively positioned in substantially a central portion between the first fin group 452 and the second fin group 454. Finite element analysis and different aero/thermal/stress modeling tools as known to one skilled in the art may be used to optimize the location of the integral bellows portion. While the integral bellows portion is depicted in unitary heat exchanger 204 in substantially a central portion of the relatively integrally-formed, compliant heat exchanger tubes, between the first fin group and the second fin group thereof, it is to be understood that the integral bellows portion may be selectively located in other positions along the length of the integrally-formed compliant heat exchanger tube, and in other relative positions to the fin groups. While each integrally-formed, compliant heat exchanger tube 402 is illustrated with a single integral bellows portion, it is to be understood that the integrally-formed compliant heat exchanger tube 402 may include additional integral bellows portions.

Still referring to FIG. 4B, in an embodiment, the integral bellows portion 425 includes a slip joint 427 and a corresponding bellows 429 formed in the tubular wall of the tubular member. More specifically, the slip joint 427 is formed in the inner wall surface (thereby including an "inner slip joint" that is not visible in FIG. 4A) and the bellows 429 is formed in the outer wall surface, i.e., the slip joint 427 is situated within the tube interior 418. The slip joint 427 is an overlapping slip joint, in that a first section a of the inner wall surface is offset from a second section b of the inner wall surface in the integral bellows portion of the tubular wall, but able to be slid together during thermal contraction and expansion of the unitary heat exchanger 204, i.e., the first and second sections of the inner wall surface are slidingly interconnected in overlapped relation.

More specifically, the first section a of the inner wall surface of the tubular wall in the integral bellows portion of the tubular member overlaps the second section b of the inner wall surface of the tubular wall in the integral bellows portion 425 of the tubular wall to define the slip joint 427. The slip joint permits thermal expansion and contraction (i.e., relative motion) of the integrally-formed heat exchanger tube 402 relative to the inlet and outlet ports 408 and 412 without causing thermo-mechanical failure. The faces of the slip joint 427 define a backward-facing step 432 in the tube interior. The term "backward-facing" refers to the step facing opposite the flow direction in the tube interior (indicated by arrow 419). During operation, some flow turbulence occurs at the backward-facing step 432. The backward-facing step substantially prevents fluid back up in the tube interior that would otherwise cause recirculation and pressure drops within the integrally-formed compliant heat exchanger tube, i.e., the backward-facing step of the slip joint controls flow distortion as fluid is conveyed from the inlet to the outlet of the unitary heat exchanger. The shape of the backward-facing step is uniform and continuous around the entire inner circumference of the tubular member.

Still referring to FIG. 4B and now to FIG. 4C, the bellows 429 of the integral bellows portion 425 includes a plurality of convolutes 431 that extend radially outwardly and circumscribe at least a portion of the integrally-formed compliant heat exchanger tube 402. The convolutes are spaced apart from one another in the axial direction of the tube. The bellows 429 may be formed such that a first pitch length 435 between adjacent convolutes may be the same or different than a second pitch length 437 between two other adjacent convolutes. Similarly, a first wall thickness 439 may be the same or different than a second wall thickness 441. The wall thickness distribution in the bellows may be tapered gradually to provide optimal stiffness or improved stress distribution in the bellows. Similarly, a first inner radius 443 may be the same or a different size than a second inner radius of curvature 445, and a first outer radius 447 may be the same or a different size than a second outer radius of curvature 442. Various combinations of pitch lengths, thickness distributions, inner radius of curvatures, and outer radii of curvatures may be employed in the bellows to optimize the configuration for performance, life, cost, and weight. Fabrication of the unitary heat exchangers having the integrally-formed compliant heat exchanger tubes using additive manufacturing techniques as hereinafter described enables the bellows diameter 451 at a first end to be the same or different from the bellows diameter 453 at a second end if desired for enhanced performance or reduced weight, among other reasons.

The bellows 429 is compressible and expandable to accommodate thermal expansion and contraction of the integrally-formed compliant heat exchanger tube. The convolutes provide such compliance for accommodating strain (relative movement) during thermal contraction and expansion. The bellows may be axisymmetrically formed about a tube centerline 433. Each end of the bellows forms a seal with the remaining portions of the tubular wall, thereby preventing any leakage from inside the integrally-formed compliant heat exchanger tube 402. The bellows absorbs linear growth caused by thermal expansion. Small fluidic interaction from inside the heat exchanger tube through the slip joint can be tolerated as the bellows acts as a seal, but it is desirable to avoid leakage to the tube exterior. Thus, the slip joint and bellows of the integral bellows portion cooperate to form a compliant sealed joint for the integrally-formed compliant heat exchanger tube. The integral bellows portion of each tube absorbs thermal movement and vibration thereof. The integral bellows portion provides the compliance to the integrally-formed compliant heat exchanger tube, thereby minimizing thermo-mechanical fatigue (TMF) during thermal contraction and expansion.

Figure 5A:
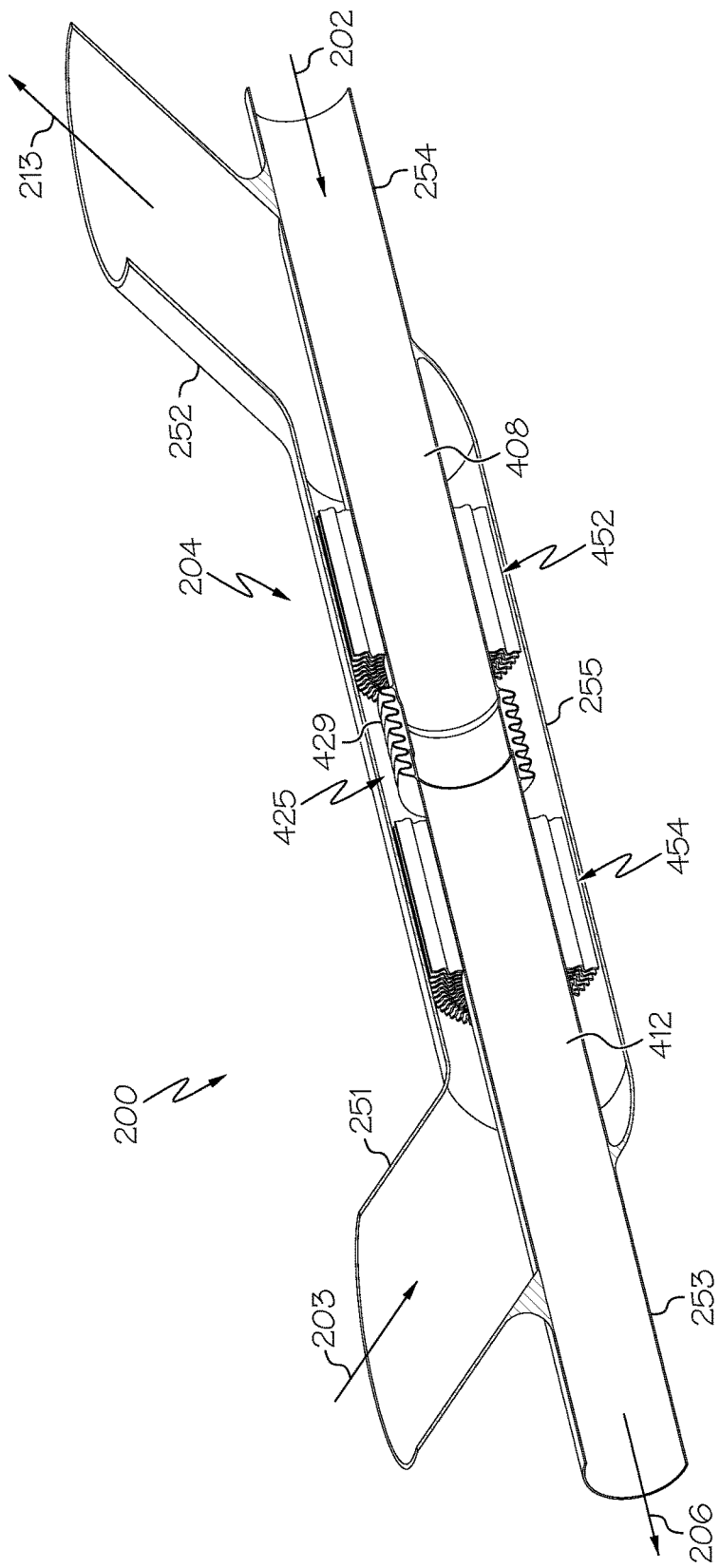
Figure 5B:
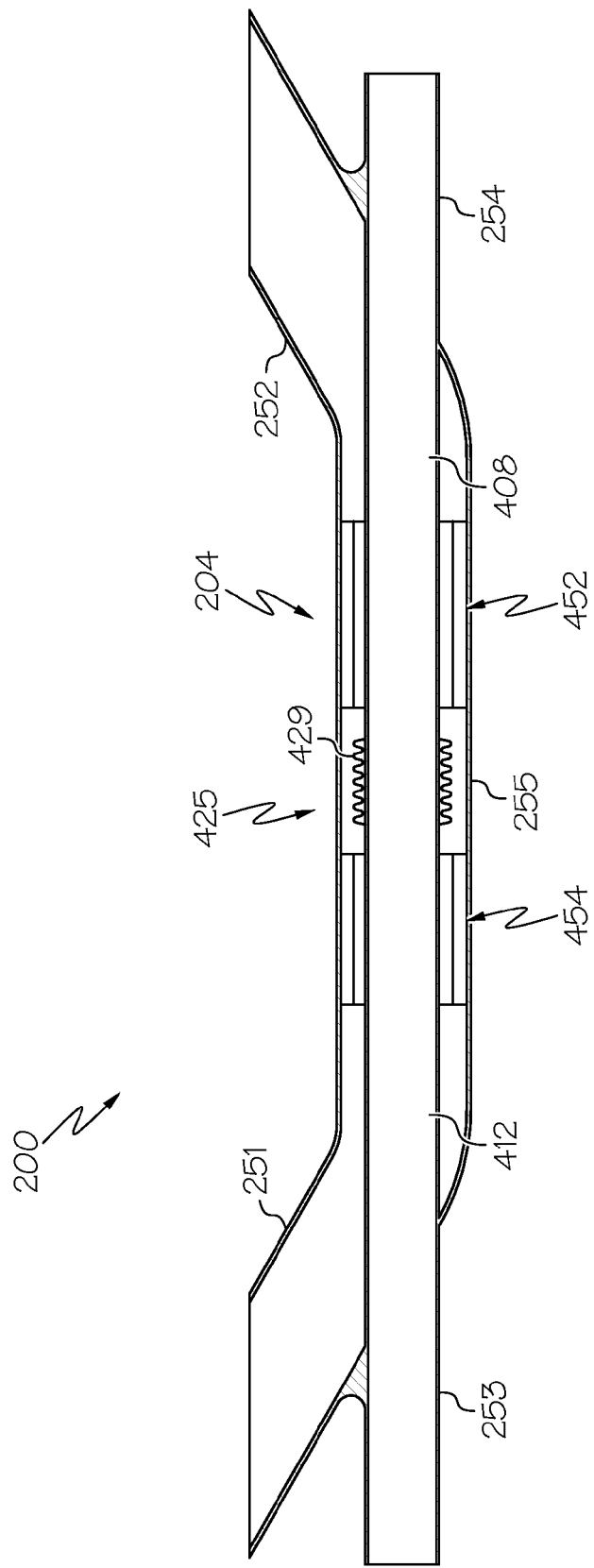

FIGS. 5A through 5C provide additional views of the cooling air system 200 incorporating the integrally-formed, compliant heat exchanger 204. The heat exchanger 204, including the bellows portion 425 and the first and second fin groups 452, 454, is formed fully within the cylindrical confines of mid portion 255, namely along tube 402. Cooling fan air 203 flows into inlet portion 251, exchanges heat with the hot air flow in mid portion 255 that includes the heat exchanger 204, and then flows out through outlet portion 252 as flow 213. Hot air 202 flows, countercurrent to the cooling fan air flow, into inlet portion 254, exchanges heat as noted above in heat exchanger 204, and then flows out through outlet portion 253 as cooled air 206.

Figure 6B:
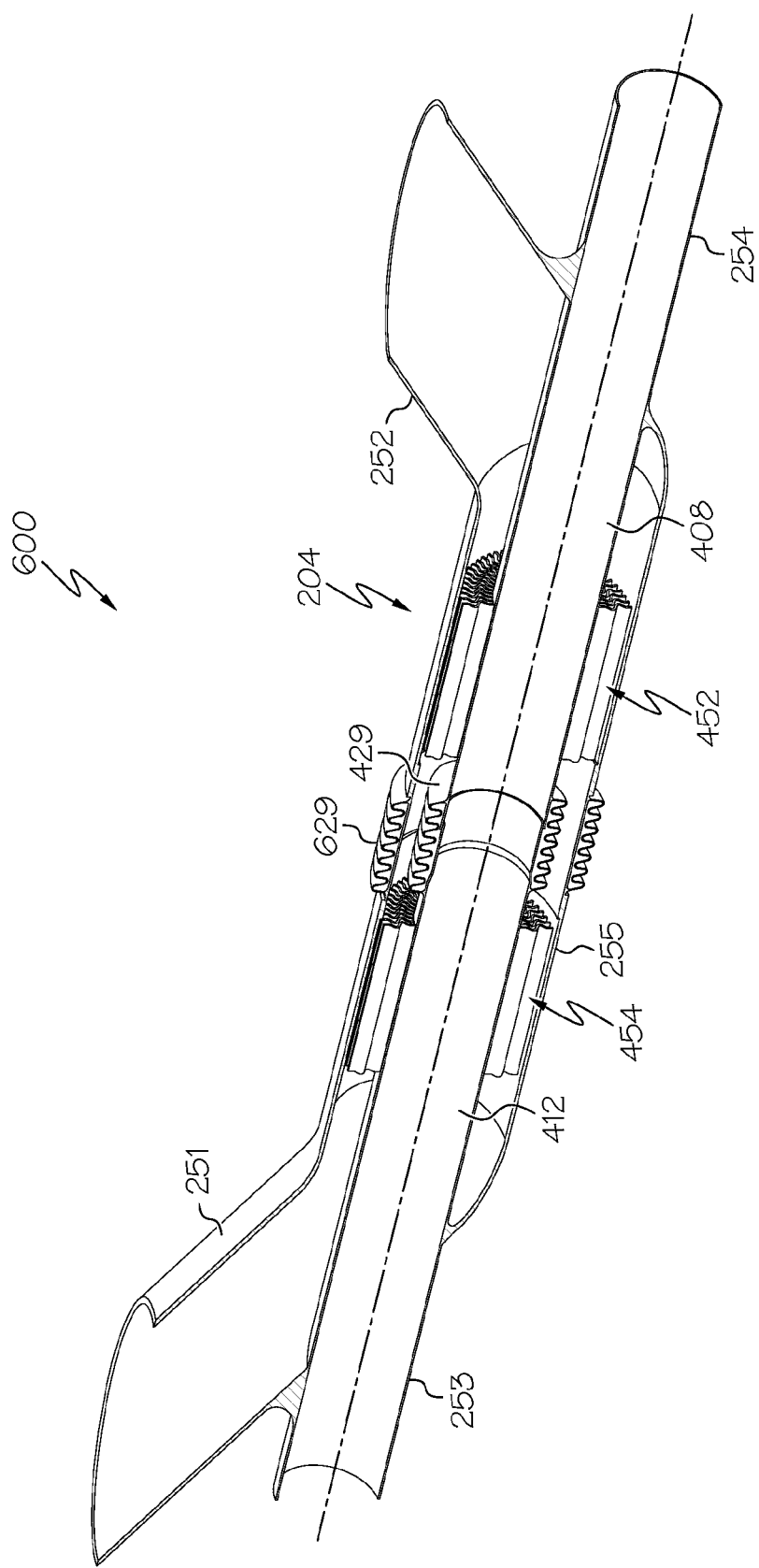

In other embodiments, as shown in FIGS. 6A and 6B, a cooling air system 600 may be provided wherein the outer cylinder of mid portion 255 may, in addition to the bellows 429 of the heat exchanger 204, include a bellows 629 for additional compliance and TMF mitigation (bellows 629 is visible in FIG. 6A, and both bellows 429 and 629 are visible in FIG. 6B). To this end, the bellows 629 may include a slip joint, and be formed substantially in the manner described above with regard to FIGS. 4B and 4C. In further alternative embodiments (not illustrated), only the outer cylinder of the mid portion 255 has a bellows, and the heat exchanger 204 does not.

In general, it is expected that, based on the teachings herein, a person having ordinary skill in the art will be able to modify the heat exchange system as above to conform for use in a wide variety of applications, as the selection of size, shape, etc. of working components is generally considered to be within the level of skill of a person having ordinary skill in the art. As such, the various possible implementations of the heat exchange systems should not be considered limited to any of the embodiments presented herein.

It will be appreciated that certain features of the presently described heat exchange systems would be prohibitively expensive to manufacture using conventional manufacturing techniques. These include the contoured or curved inlets, the varying wall thickness features, and the structurally compliant connection portions, among others. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials. Still further, casting or metal injection molding (MIM) may be employed.

Figure 7:
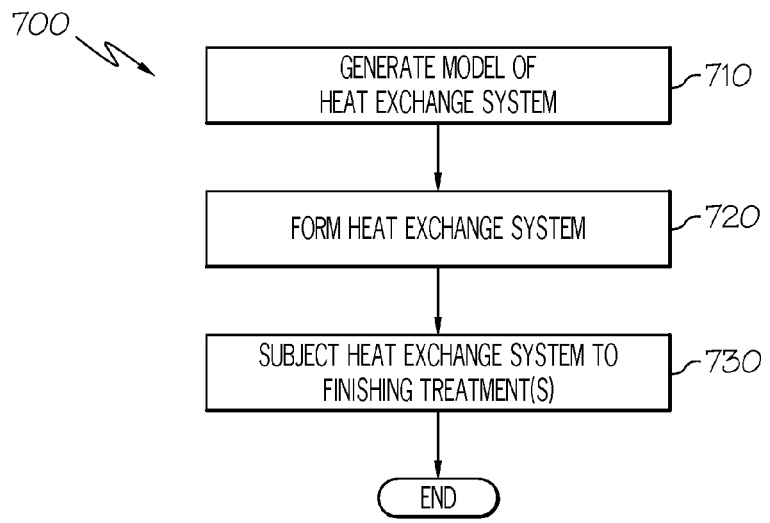
FIG. 7 is a flow diagram illustrating steps in a method of manufacturing a heat exchange system in accordance with embodiments of the present disclosure.

FIG. 7 is a flowchart illustrating a method 700 for manufacturing a heat exchange system, such as the cooling air heat exchanger 204 as shown in FIG. 3B, in accordance with an exemplary embodiment using, in whole or in part, additive manufacturing techniques. In the discussion that follows, "the heat exchange system" will be referred to generically as representative of any or all portions of a heat exchange system in accordance with the present disclosure, including but not limited to the tubes 402 and the cylindrical portions of system 200, 600, etc., that can be made using additive manufacturing techniques. Of course, as discussed above, various components of the heat exchange system, whether made by additive manufacturing techniques or otherwise, may be brazed or otherwise joined together to form a completed heat exchange system, such as the cooling air heat exchanger 204 as shown in FIG. 3B.

In a first step 710, a model, such as a design model, of the heat exchange system may be defined in any suitable manner. For example, the model may be designed with computer aided design (CAD) software and may include three-dimensional ("3D") numeric coordinates of the entire configuration of the heat exchange system including both external and internal surfaces. In one exemplary embodiment, the model may include a number of successive two-dimensional ("2D") cross-sectional slices that together form the 3D component.

In step 720 of the method 700, the heat exchange system is formed according to the model of step 710. In one exemplary embodiment, a portion of the heat exchange system is formed using a rapid prototyping or additive layer manufacturing process. In other embodiments, the entire heat exchange system is formed using a rapid prototyping or additive layer manufacturing process. Although additive layer manufacturing processes are described in greater detail below, in still other alternative embodiments, portions of the heat exchange system may be forged or cast in step 720, for example, with a single-crystal structure.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the heat exchange system in step 720. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above.

As such, in one exemplary embodiment, step 720 is performed with DMLF techniques to form the heat exchange system. However, prior to a discussion of the subsequent method steps, reference is made to FIG. 8, which is a schematic view of a DMLF system 800 for manufacturing the heat exchange system, for example cooling air heat exchanger 204 as shown in FIG. 3B, in accordance with an exemplary embodiment.

Figure 8:
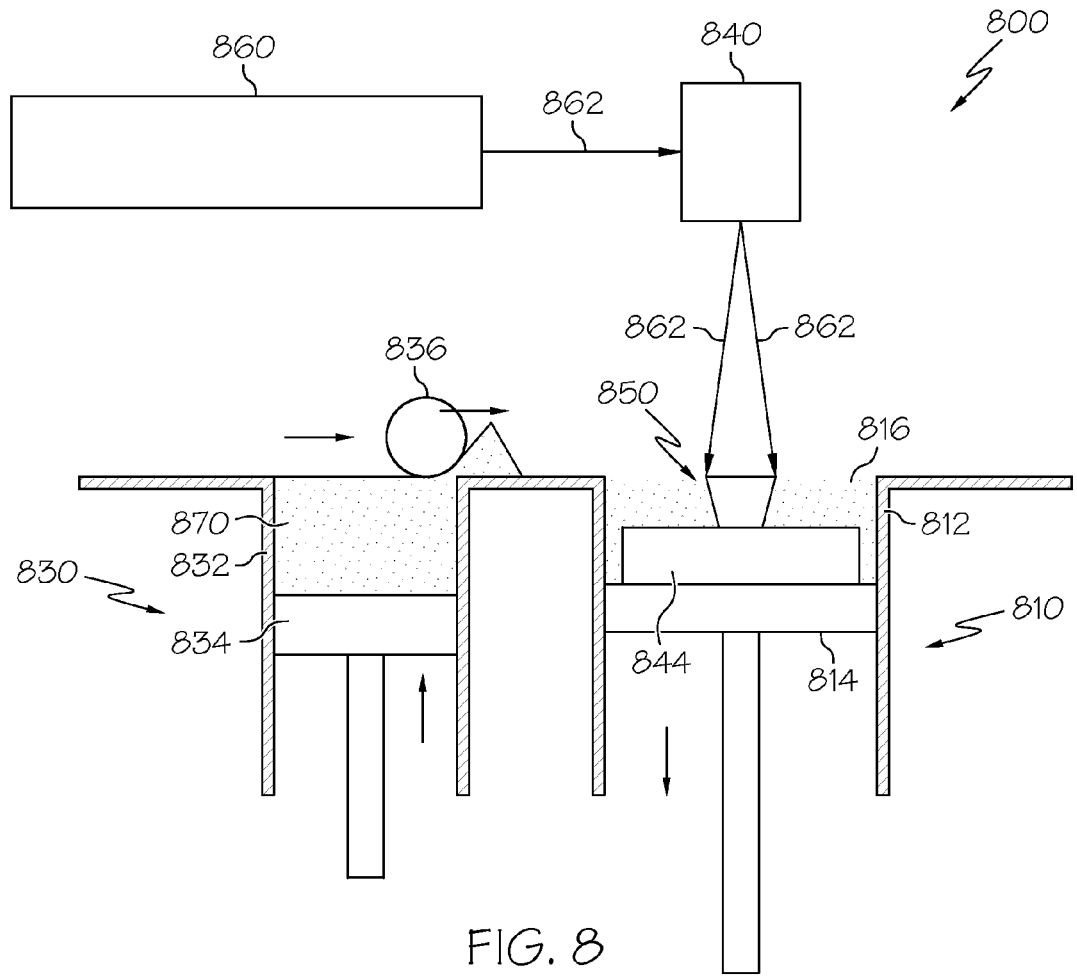
FIG. 8 is an exemplary additive manufacturing system suitable for use in manufacturing heat exchange systems in accordance with the present disclosure.

Referring to FIG. 8, the system 800 includes a fabrication device 810, a powder delivery device 830, a scanner 840, and a laser 860 that function to manufacture the article 850 (e.g., the heat exchange system, or a component thereof) with build material 870. The fabrication device 810 includes a build container 812 with a fabrication support 814 on which the article 850 is formed and supported. The fabrication support 814 is movable within the build container 812 in a vertical direction and is adjusted in such a way to define a working plane 816. The delivery device 830 includes a powder chamber 832 with a delivery support 834 that supports the build material 870 and is also movable in the vertical direction. The delivery device 830 further includes a roller or wiper 836 that transfers build material 870 from the delivery device 830 to the fabrication device 810.

During operation, a base block 844 may be installed on the fabrication support 814. The fabrication support 814 is lowered and the delivery support 834 is raised. The roller or wiper 836 scrapes or otherwise pushes a portion of the build material 870 from the delivery device 830 to form the working plane 816 in the fabrication device 810. The laser 860 emits a laser beam 862, which is directed by the scanner 840 onto the build material 870 in the working plane 816 to selectively fuse the build material 870 into a cross-sectional layer of the article 850 according to the design. More specifically, the speed, position, and other operating parameters of the laser beam 862 are controlled to selectively fuse the powder of the build material 870 into larger structures by rapidly melting the powder particles that may melt or diffuse into the solid structure below, and subsequently, cool and re-solidify. As such, based on the control of the laser beam 862, each layer of build material 870 may include unfused and fused build material 870 that respectively corresponds to the cross-sectional passages and walls that form the article 850. In general, the laser beam 862 is relatively low power to selectively fuse the individual layer of build material 870. As an example, the laser beam 862 may have a power of approximately 50 to 500 Watts, although any suitable power may be provided.

Upon completion of a respective layer, the fabrication support 814 is lowered and the delivery support 834 is raised. Typically, the fabrication support 814, and thus the article 850, does not move in a horizontal plane during this step. The roller or wiper 836 again pushes a portion of the build material 870 from the delivery device 830 to form an additional layer of build material 870 on the working plane 816 of the fabrication device 810. The laser beam 862 is movably supported relative to the article 850 and is again controlled to selectively form another cross-sectional layer. As such, the article 850 is positioned in a bed of build material 870 as the successive layers are formed such that the unfused and fused material supports subsequent layers. This process is continued according to the modeled design as successive cross-sectional layers are formed into the completed desired portion, e.g., the heat exchange system of step 720.

The delivery of build material 870 and movement of the article 850 in the vertical direction are relatively constant and only the movement of the laser beam 862 is selectively controlled to provide a simpler and more precise implementation. The localized fusing of the build material 870 enables more precise placement of fused material to reduce or eliminate the occurrence of over-deposition of material and excessive energy or heat, which may otherwise result in cracking or distortion. The unused and unfused build material 870 may be reused, thereby further reducing scrap.

Any suitable laser and laser parameters may be used, including considerations with respect to power, laser beam spot size, and scanning velocity. As a general matter, the build material 870 may be formed by any suitable powder, including powdered metals, such as a stainless steel powder, and alloys and super alloy materials, such as nickel-based or cobalt superalloys. In one exemplary embodiment, the build material 870 is a high temperature nickel base super alloy such as IN718. In other embodiments, MAR-M-247, IN738, titanium, aluminum, titanium-aluminide, or other suitable alloys may be employed. In general, the powder build material 870 may be selected for enhanced strength, durability, and useful life, particularly at high temperatures, although as described below, the powder build material 870 may also be selected based on the intended function of the area being formed.

Returning to FIG. 7, at the completion of step 720, the article 850, i.e., the heat exchange system, is removed from the additive manufacturing system (e.g., from the DMLF system 800). In optional step 730, the heat exchange system formed in step 720 may undergo finishing treatments. Finishing treatments may include, for example, aging, annealing, quenching, peening, polishing, hot isostatic pressing (HIP), or coatings. One example of a post-laser fusion process of step 730 is a HIP process in which an encapsulation layer is applied to the intermediate turbine component article and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," filed Jun. 22, 2010, and published as United States Patent Application Publication No. 2011/0311389, published Dec. 22, 2011, the contents of which are herein incorporated by reference in their entirety. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

If necessary, the heat exchange system may be machined to final specifications. At this point, "the heat exchange system" as referred to herein regarding additive manufacturing techniques corresponds with the finished heat exchange system shown in FIGS. 5A through 5C, or 6A and 6B, for example. In further steps (not shown), the heat exchange system may be tested and installed in a gas turbine engine, as shown in FIG. 2, for example.

The method 700 has been discussed above with reference to the formation of a single heat exchange system. However, in one exemplary embodiment of the method 700, more than one heat exchange system may be manufactured simultaneously. Unless otherwise noted, method 700 in this embodiment proceeds as discussed above. In this embodiment of the method 700, the articles are formed on a common base block (e.g., base block 844) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

Accordingly, exemplary embodiments may enhance heat exchange systems fabricated with additive manufacturing techniques, including DMLF/DMLS. In particular, durability and life span of the heat exchange system may be improved by manufacturing each portion of the heat exchange system using designs that minimize the structural stresses that will be encountered during operation, and by improving the physical connection between the various components. Additionally, rapid prototyping and manufacturing reduces cracks and other issues and reduces costs and cycle time in the system design, particularly in the iterative environment of gas turbine engine component design.

While at least one exemplary embodiment has been presented in the foregoing detailed description, it should be appreciated that a vast number of variations exist. It should also be appreciated that the exemplary embodiments of the heat exchange system are only examples, and are not intended to limit the scope, applicability, or configuration of the invention in any way. Rather, the foregoing detailed description will provide those skilled in the art with a convenient road map for implementing an exemplary embodiment of the inventive heat exchange system. It is understood that various changes may be made in the function and arrangement of elements described in an exemplary embodiment without departing from the scope of the invention as set forth in the appended claims.

What is claimed is:

1. A gas turbine engine including a heat exchange system, the gas turbine engine comprising:

a fan section, a compressor section, a combustor section, a turbine section, and an annular fan air bypass duct disposed circumferentially about the compressor section, the combustor section, and the turbine section, wherein the annular fan air bypass duct is defined by a radially inner duct wall and a radially outer duct wall which together form an annulus, and wherein the heat exchange system comprises:

a tubular fan air inlet portion defining a first central axis that passes centrally through an entirety of the tubular fan air inlet portion, and a tubular cooled air outlet portion defining a second central axis that passes centrally through an entirety of the tubular cooled air outlet portion, the tubular fan air inlet portion being connected to a first end of a tubular mid portion, and the tubular cooled air outlet portion being entirely within the tubular fan air inlet portion at a connection point of the tubular fan air inlet portion to the first end of the tubular mid portion;

a tubular hot air inlet portion defining a third central axis that passes centrally through an entirety of the tubular hot air inlet portion, and a tubular recycled fan air outlet portion defining a fourth central axis that passes centrally through an entirety of the tubular recycled fan air outlet portion, the tubular recycled fan air outlet portion being connected to a second end of the tubular mid portion, and the tubular hot air inlet portion being entirely within the tubular recycled fan air outlet portion at a connection point of the tubular recycled fan air outlet portion to the second end of the tubular mid portion;

an integrally-formed, compliant heat exchanger tube extending between the tubular hot air inlet portion and the tubular cooled air outlet portion within the tubular mid portion to define a heat exchanger first flow passage within the integrally-formed, compliant heat exchanger tube and a second flow passage outside of the heat exchanger tube but within the tubular mid portion, wherein the integrally-formed, compliant heat exchanger tube defines a fifth central axis that passes centrally through an entirety of the integrally-formed, compliant heat exchanger tube, and wherein the integrally-formed, compliant heat exchanger tube comprising:

a tubular member having a proximal tube end coupled with the tubular hot air inlet portion and a distal tube end coupled with the tubular cooled air outlet portion and comprising a tubular wall having an outer wall surface and an inner wall surface;

a plurality of integral heat transfer fins extending radially outwardly from at least one portion of the tubular member; and an integral bellows portion, the integral bellows portion comprising a bellows in the outer wall surface and a slip joint in the inner wall surface, wherein the slip joint comprises radially-inner and radially-outer adjacently overlapping members, and wherein the radially-inner overlapping member comprises a backward-facing step portion that angles away from an air flow direction inside the integrally-formed compliant heat exchanger tube, wherein each of the first, second, third, fourth, and fifth central axes define a single plane, wherein the first central axis forms an angle α with respect to both the second and fifth central axes of from about 20 degrees to about 60 degrees within the single plane, and wherein the fourth central axis forms an angle β with respect to both the third and fifth central axes of from about 20 degrees to about 60 degrees within the single plane, and wherein the tubular fan air inlet portion, the tubular mid portion, and the tubular recycled fan air outlet portion have a first width such that at the first end of the tubular mid portion, the tubular fan air inlet portion continuously and contiguously curves and joins with the tubular mid portion, and such that at the second end of the tubular mid portion, the tubular recycled fan air outlet portion continuously and contiguously curves and joins with the tubular mid portion, wherein the tubular hot air inlet portion and the tubular cooled air outlet portion have a second width, and wherein the first width is greater than the second width; and wherein the radially inner duct wall of the annular fan air bypass duct extends in a fan air flow direction parallel to the fifth central axis and comprises a first, upstream opening and a second, downstream opening, the single plane passing through both of the first, upstream opening and the second, downstream opening, wherein tubular fan air inlet portion is physically and fluidly coupled to the first, upstream opening and the tubular recycled fan air outlet portion is physically and fluidly coupled to the second, downstream opening, and wherein the first central axis forms an angle with respect to the fan air flow direction of radially inner duct wall that is equal to angle α, and wherein the fourth central axis forms an angle with respect to the fan air flow direction radially inner duct wall that is equal to angle β.

2. The gas turbine engine including the heat exchange system of claim 1, wherein the integrally-formed, compliant heat exchanger tube comprises at least one of a curved tube and a linear tube.

3. The gas turbine engine including the heat exchange system of claim 1, wherein the integrally-formed, compliant heat exchanger tube comprises curved tubes, relatively straight tubes, and combinations thereof.

4. The gas turbine engine including the heat exchange system of claim 1, wherein the bellows comprises a plurality of convolutes extending radially outwardly from a portion of the tubular member and circumscribing the tubular member, the plurality of convolutes being spaced from one another along the fifth central axis of the integrally-formed, compliant heat exchanger tube, the bellows being compressible and expandable to accommodate thermal expansion and contraction of the integrally-formed compliant heat exchanger tube.

5. The gas turbine engine including the heat exchange system of claim 4, wherein the tubular mid portion further comprises a bellows comprising a plurality of convolutes extending radially outwardly from a portion of the mid portion and circumscribing the mid portion.

6. The gas turbine engine including the heat exchange system of claim 1, wherein the tubular fan air inlet portion, the tubular cooled air outlet portion, the tubular mid portion, the tubular hot air inlet portion, and the tubular recycled fan air outlet portion are cylindrical in shape.

7. The gas turbine engine including the heat exchange system of claim 1, wherein the tubular hot air inlet portion is fluidly coupled to the compressor section of the gas turbine engine.

8. The gas turbine engine including the heat exchange system of claim 7, wherein the tubular cooled air outlet portion directs cooling air to a compressor turbine of the gas turbine engine, and wherein the tubular recycled fan air outlet portion directs recycled fan air back into the fan air bypass duct.

9. The gas turbine engine including the heat exchange system of claim 1 comprising a plurality of the heat exchange systems as defined in claim 1.

10. The gas turbine engine including the heat exchange system of claim 9, wherein the plurality of the heat exchange systems are disposed annularly about an inner fan duct of the gas turbine engine.

* * * * *